(12) United States Patent
Ito et al.

(10) Patent No.: US 9,247,076 B2
(45) Date of Patent: Jan. 26, 2016

(54) PORTABLE TERMINAL DEVICE AND METHOD OF CONTROLLING PORTABLE TERMINAL DEVICE

(71) Applicant: FUJITSU LIMITED, Kawasaki-shi, Kanagawa (JP)

(72) Inventors: Shusaku Ito, Fukuoka (JP); Yasuji Ota, Yokohama (JP); Takeshi Otani, Kawasaki (JP); Taro Togawa, Kawasaki (JP); Masanao Suzuki, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 272 days.

(21) Appl. No.: 13/925,186

(22) Filed: Jun. 24, 2013

(65) Prior Publication Data

US 2013/0281165 A1 Oct. 24, 2013

Related U.S. Application Data

(63) Continuation of application No. PCT/JP2010/073599, filed on Dec. 27, 2010.

(51) Int. Cl.
H04M 19/04 (2006.01)
H04M 1/02 (2006.01)

(52) U.S. Cl.
CPC .......... *H04M 19/047* (2013.01); *H04M 1/0241* (2013.01)

(58) Field of Classification Search
CPC .......................... H04M 19/047; H04M 1/0241
USPC ................ 455/550.1, 567, 552.1, 90.2, 67.11
See application file for complete search history.

(56) References Cited

U.S. PATENT DOCUMENTS

2007/0087777 A1* 4/2007 Shibuya et al. ............ 455/550.1
2011/0152729 A1* 6/2011 Oohashi et al. .................... 601/2
2011/0190595 A1* 8/2011 Bennett et al. ................ 600/301

FOREIGN PATENT DOCUMENTS

| EP | 1686776 | 8/2006 |
| JP | 5-316016 | 11/1993 |
| JP | 2004-56623 | 2/2004 |
| JP | 2004-129120 | 4/2004 |

OTHER PUBLICATIONS

Chinese Office Action issued Nov. 24, 2014 in corresponding Chinese Patent Application No. 201080070937.6.
Patent Abstracts of Japan, Publication No. 5-316016, Published Nov. 26, 1993.
Japanese Patent Office Action dated Feb. 4, 2014 in Appln. No. 2012-550606.
International Search Report mailed Mar. 1, 2011 in corresponding International Application No. PCT/JP2010/073599.
Patent Abstracts of Japan, Publication No. 2004-056623, published Feb. 19, 2004.
Patent Abstracts of Japan, Publication No. 2004-129120, published Apr. 22, 2004.

* cited by examiner

*Primary Examiner* — John J Lee
(74) *Attorney, Agent, or Firm* — Staas & Halsey LLP (57) ABSTRACT

A portable terminal device includes a vibrator configured to vibrate a housing; an analysis section configured to execute frequency analysis on an input sound from a microphone; a calculating section configured to calculate an amount of temporal change of a spectrum obtained by the analysis section for the input sound when the housing vibrates; and a control section configured to execute incoming-call control depending on the amount of temporal change calculated by the calculating section.

11 Claims, 13 Drawing Sheets

PORTABLE TERMINAL DEVICE AND METHOD OF CONTROLLING PORTABLE TERMINAL DEVICE

CROSS-REFERENCE TO RELATED APPLICATIONS

This application is a continuation application of International Application PCT/JP2010/073599 filed on Dec. 27, 2010 and designated the U.S., the entire contents of which are incorporated herein by reference.

FIELD

The invention relates to a portable terminal device that has a vibrator function and a method of controlling a portable terminal device.

BACKGROUND

Conventionally, there are portable terminal devices that indicate an incoming call to a user by vibrating a vibrator when receiving the incoming call. However, depending on a place where the portable terminal device is located, unpleasant sound may be generated by rumbling of the vibrator.

Accordingly, there is a technology that controls rumbling of a vibrator by measuring sound pressure levels of the vibrator under vibration and under suspension, at the surroundings by a microphone, and comparing difference of the sound pressure levels with a threshold value.

Also, there is a technology that determines whether cause of noise is originated from a vibrator, then based on a determination result, controls strength of vibration of the vibrator.

RELATED-ART DOCUMENTS

Patent Document

[Patent document 1] Japanese Laid-open Patent Publication No. 2004-56623
[Patent document 2] Japanese Laid-open Patent Publication No. 2004-129120

If a portable terminal device is inside of a bag or a pocket of clothes, it is often the case that a vibration of a vibrator is unnoticed. For example, a bag or a pocket of clothes, where a vibration of the vibrator tends to be unnoticed, touches a portable terminal device on multiple surfaces, whereas a desk or the like touches the portable terminal device on a single surface.

If a contacting state of a portable terminal device can be estimated, it is considered that behavior of the portable terminal device can be controlled properly when an incoming call arrives. On the other hand, as the conventional technologies only refer to a power of the surrounding sound as a basis for determination, the power of the sound remains almost unchanged if the contacting state changes, hence the contacting state cannot be estimated.

SUMMARY

According to an embodiment of the disclosures, a portable terminal device includes a vibrator configured to vibrate a housing; an analysis section configured to execute frequency analysis on an input sound from a microphone; a calculating section configured to calculate an amount of temporal change of a spectrum obtained by the analysis section for the input sound when the housing vibrates; and a control section configured to execute incoming-call control depending on the amount of temporal change calculated by the calculating section.

The object and advantages of the embodiment will be realized and attained by means of the elements and combinations particularly pointed out in the claims. It is to be understood that both the foregoing general description and the following detailed description are exemplary and explanatory and are not restrictive of the invention as claimed.

DESCRIPTION OF EMBODIMENTS

In the following, embodiments will be described with reference to the drawings.

First Embodiment

Configuration

Figure 1:
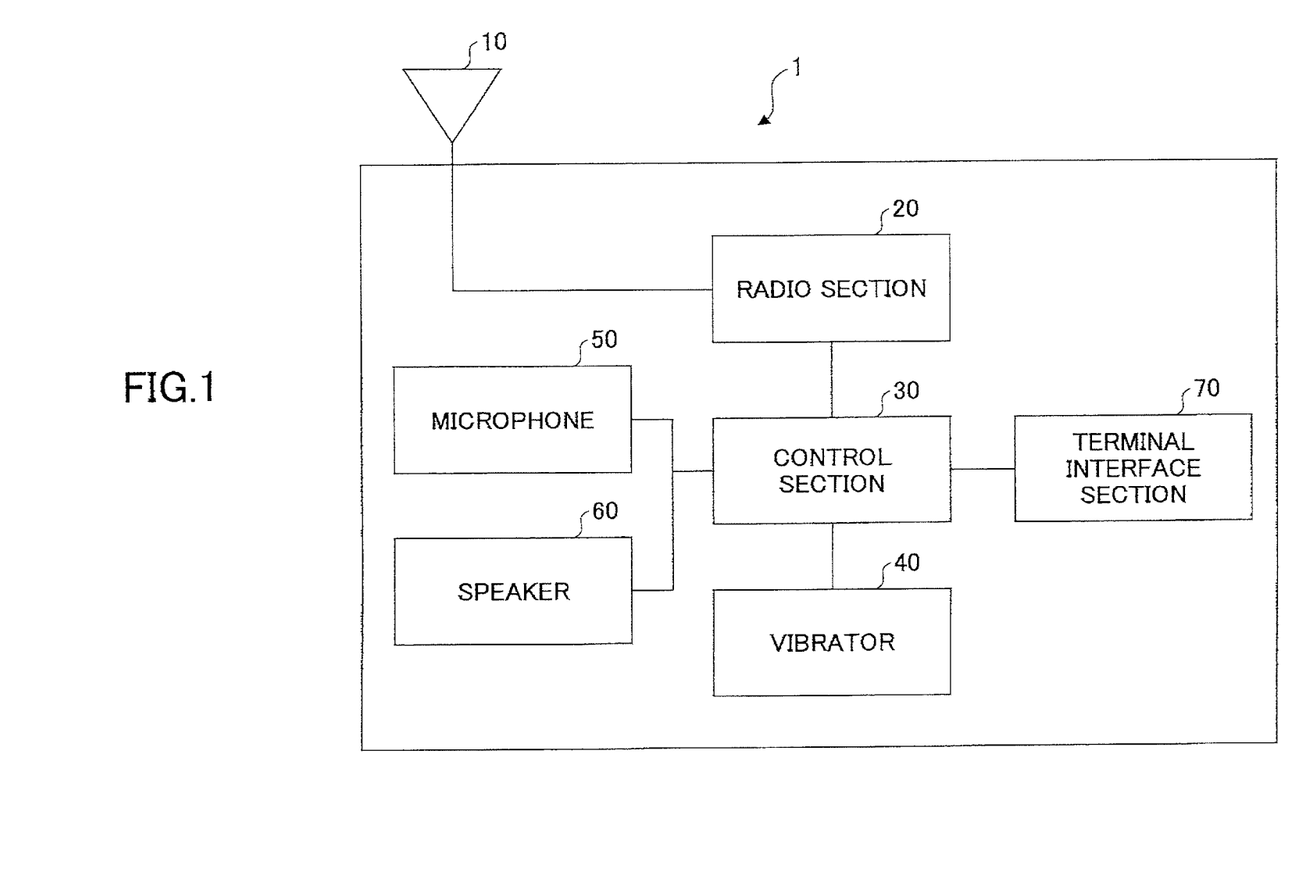
FIG. 1 is a block diagram illustrating an example of hardware of a portable terminal device according to a first embodiment.

FIG. 1 is a block diagram illustrating an example of hardware of a portable terminal device 1 to the first embodiment. The portable terminal device 1 includes an antenna 10, a radio section 20, a control section 30, a vibrator 40, a microphone 50, a loudspeaker 60, and a terminal interface section 70.

The antenna 10 sends a radio signal amplified by a sending amplifier, and receives a radio signal sent from a base station. The radio section 20 applies a D/A conversion to the sending signal spread by the control section 30, converts it to a high frequency signal by a quadrature modulation, and amplifies the signal by a power amplifier. The radio section 20 amplifies the received radio signal and applies an A/D conversion to the amplified signal to send it to the control section 30.

The control section 30 executes various baseband processing such as an addition of error correcting codes to sending data, data modulation, spread modulation, despreading of a received signal, determination of receiving environment, determination of a threshold value for each channel signal, error correction decoding, etc. The control section 30 also executes radio control such as sending/receiving of a control signal. Here, the baseband processing may be executed with a different configuration from the control section 30.

The terminal interface section 70 executes adapter processing for data, and interface processing with a handset and an external data terminal.

<Function>

Figure 2:
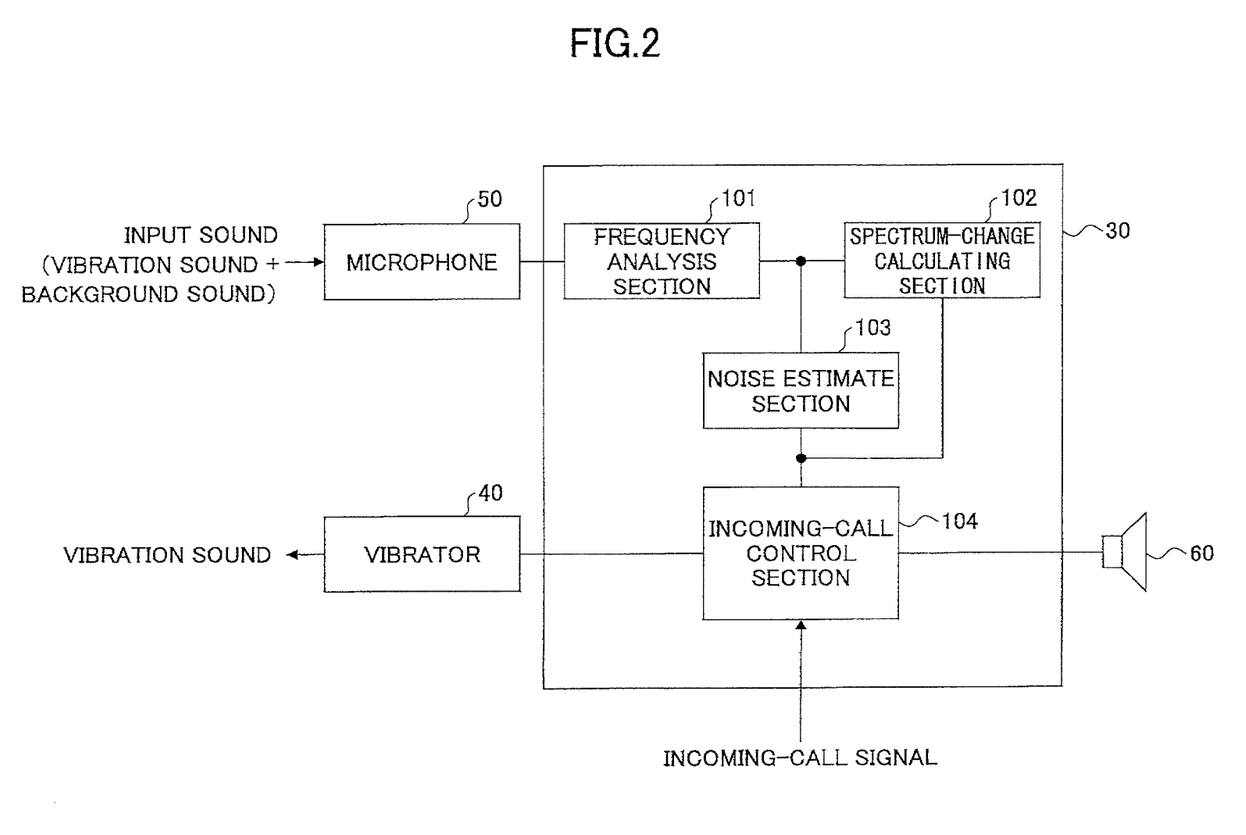
FIG. 2 is a block diagram illustrating an example of functions of a control section according to the first embodiment.

Next, functions of the portable terminal device 1 will be described according to the first embodiment. FIG. 2 is a block diagram illustrating an example of functions of the control section 30 according to the first embodiment. As illustrated in FIG. 2, the control section 30 includes a frequency analysis section 101, a spectrum-change calculating section 102, a noise estimate section 103, and an incoming-call control section 104.

The frequency analysis section 101 obtains input sound from the microphone 50, and executes frequency analysis on the obtained input sound. The input sound includes vibration sound, background sound, and the like. Frequency analysis may be executed, for example, with a known technology such as fast Fourier transform (FFT) or wavelet transform.

The frequency analysis section 101 applies, for example, FFT (256 points) to the input sound (8 kHz). The input sound is represented by x(n), and the input spectrum is represented by X(f). Also, the frequency analysis section 101 calculates a power spectrum from the input spectrum according to the following formula (1).

$$S(f)=10\log_{10}(|X(f)^2|) \quad \text{FORMULA 1}$$

S(f) represents a power spectrum.

The power spectrum S(f) obtained by the frequency analysis section 101 is output to the spectrum-change calculating section 102 and the noise estimate section 103.

The spectrum-change calculating section 102 calculates an amount of temporal change of the power spectrum from the power spectrum obtained by the frequency analysis section 101. In the following, calculation methods for an amount of change will be described for a case where an influence of noise is removed, and for a case where the influence is not removed.

(1) Case where the Influence of Noise is Not Removed

The spectrum-change calculating section 102 calculates an amount of temporal change of the power spectrum (called an "amount of temporal change", hereafter) according to the following formula (2).

$$\Delta=1/\text{count}\cdot\Sigma_{f_{low}}^{f_{high}}(S_t(f)-S_{t-1}(f)) \quad \text{FORMULA 2}$$

Δ: average amount of temporal change
t: frame number
f: frequency number
$S_t(f)$: power spectrum of t frame
$S_{t-1}(f)$: power spectrum of t−1 frame
$f_{low}$: lower limit of the calculated frequency
$f_{high}$: upper limit of the calculated frequency
count: the number of measured bands For example, $f_{low}=0$, and $f_{high}=64$ (2 kHz). The spectrum-change calculating section 102 outputs the calculated amount of temporal change Δ to the incoming-call control section 104. Here, the average amount of temporal change Δ is not necessarily the average, but it may be an accumulation of temporal differences of the power spectrum.

Figure 3:
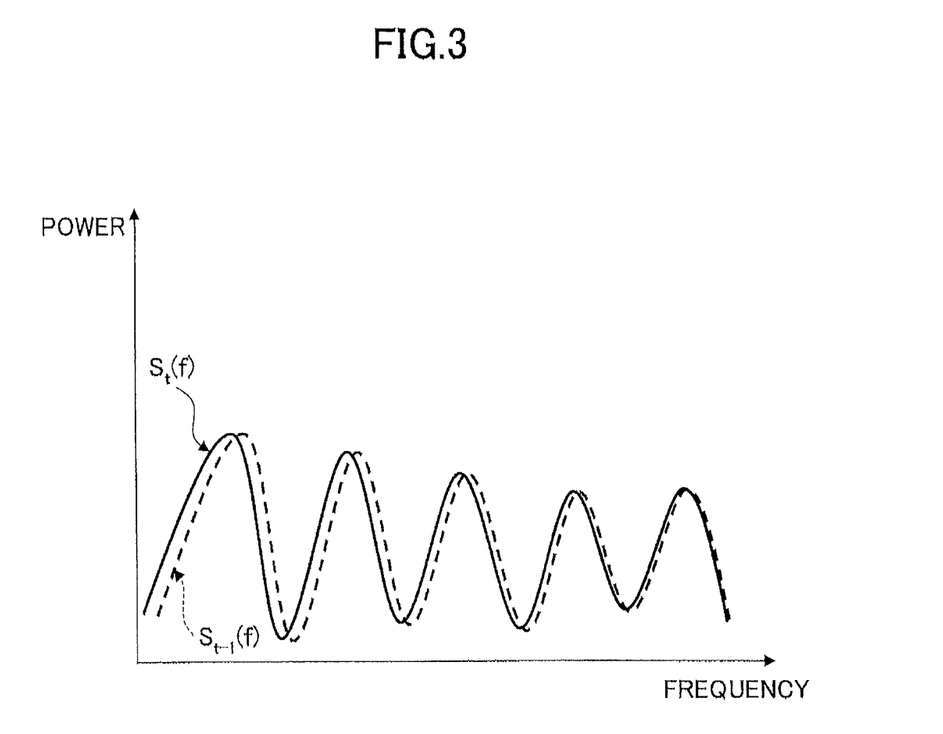
FIG. 3 is a schematic view illustrating a change of a spectrum.

FIG. 3 is a schematic view illustrating a change of a spectrum. A solid line illustrated in FIG. 3 represents a power spectrum $S_t(f)$ at a certain time, and a dotted line represents the power spectrum $S_{t-1}(f)$ at the certain time minus 1. By taking a difference between these power spectrums, the spectrum-change calculating section 102 calculates the amount of temporal change of the spectrum.

(2) Case where the Influence of Noise is Removed

The spectrum-change calculating section 102 obtains a noise spectrum from the noise estimate section 103. The noise spectrum is obtained by the noise estimate section 103 as follows.

The noise estimate section 103 obtains the power spectrum S(f) from the frequency analysis section 101. The noise estimate section 103 obtains the power spectrum noise (f) of the noise from the power spectrum S(f) when the vibrator 40 stops, using the following formula (3). The portable terminal device 1 can easily recognize when the vibrator 40 stops because the portable terminal device 1 is controlling the vibrator 40.

$$\text{noise}_t(f)=a\cdot\text{noise}_{t-1}(f)+b\cdot S(f) \quad \text{FORMULA 3}$$

noise(f): power spectrum of the noise
a, b: coefficient a+b=1 and a, b>0

The noise estimate section 103 outputs the noise power spectrum estimated using the power spectrum at a predetermined time to the spectrum-change calculating section 102.

The spectrum-change calculating section 102 calculates an amount of temporal change of the power spectrum within a predetermined band where noise is removed with the noise power spectrum obtained by the noise estimate section 103.

Figure 4A:
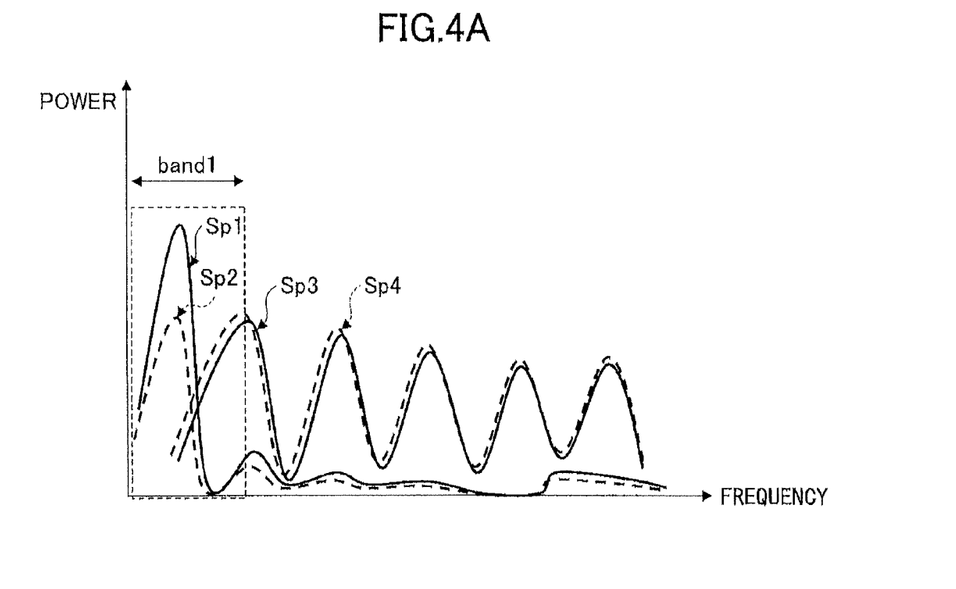
FIGS. 4A-4B are schematic views for describing influences of noise.
Figure 4B:
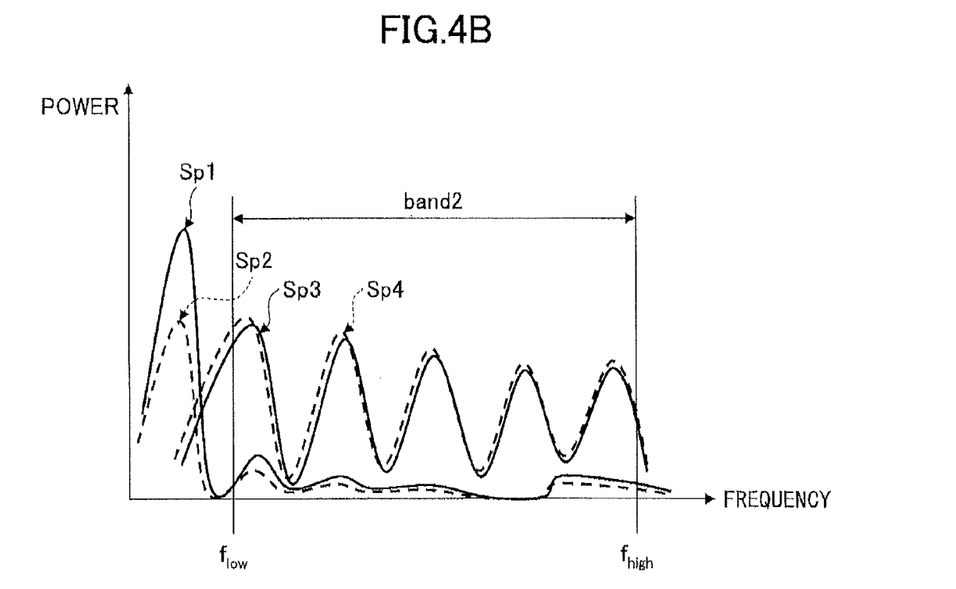

FIGS. 4A-4B are schematic views for describing influences of noise. FIG. 4A describes a case where an amount of temporal change is calculated for the whole range of a band. Sp1 illustrated in the FIG. 4A represents a power spectrum of noise at a certain time m, Sp2 represents a power spectrum of the noise at the time m−1, Sp3 represents a power spectrum of a vibration sound at the time m, and Sp4 represents a power spectrum of the vibration sound at the time m−1. In a band band1 illustrated in FIG. 4A, a correct control change of the spectrum of the vibration sound cannot be measured because the power of noise is high.

FIG. 4B describes a case where a range for spectrum calculation is limited to a predetermined band. In FIG. 4B, the amount of temporal change of the spectrum is calculated within a band band2 where an influence of noise is small. This makes it possible to analyze only the vibration sound to improve calculation precision of the amount of temporal change. Here, the following two ways, for example, may be considered as methods of obtaining a predetermined band where noise is excluded.

Predetermined Band (First One)

The spectrum-change calculating section 102 sets the predetermined band to a band where the noise power spectrum is below a threshold value of noise. Using the predetermined band, the spectrum-change calculating section 102 calculates the amount of temporal change of the spectrum according to the following formula (4).

$$\Delta=1/\text{count}\cdot\Sigma_{f_{low}}^{f_{high}}(S_t(f)-S_{t-1}(f)|\text{noise}_t(f)<\text{THR}_{pow}) \quad \text{FORMULA 4}$$

$\text{noise}_t(f)$: noise power spectrum of frame t
$\text{THR}_{pow}$: threshold value of noise The threshold value of noise $\text{THR}_{pow}$ is set to a value greater than a vibration sound, which is set to an appropriate value beforehand by an experiment or the like.

Predetermined Band (Second One)

The spectrum-change calculating section 102 sets the predetermined band to a band where a difference of levels between the noise power spectrum and the power spectrum of the vibration sound is greater than a threshold value. Using the predetermined band, the spectrum-change calculating section 102 calculates the amount of temporal change of the spectrum according to the following formula (6).

$$SNR_f = S_t(f) - \text{noise}_t(f) \quad \text{formula (5)}$$

$$\Delta = 1/\text{count} \cdot \Sigma_{f_{low}}^{f_{high}} (S_t(f) - S_{t-1}(f) | SNR_f > THR_{SNR}) \quad \text{FORMULA 6}$$

$THR_{SNR}$: threshold value of level(SNR)

The threshold value of SNR, $THR_{SNR}$, is set to, for example, 6 dB (decibel), which is set to an appropriate value beforehand by an experiment or the like.

Either one of the predetermined bands described above may be used. The spectrum-change calculating section 102 may be set beforehand to use either one of them, or a properly selected one is set into the spectrum-change calculating section 102. The spectrum-change calculating section 102 obtains the amount of temporal change of the spectrum in the predetermined band where the influence of noise is removed, then outputs the amount of temporal change to the incoming-call control section 104.

Also, when calculating the amount of temporal change of the spectrum, the spectrum-change calculating section 102 may use a band including only the oscillation frequency of the vibrator 40 and a harmonic of the oscillation frequency. This can be applied to both cases where noise is removed, and not removed. The spectrum-change calculating section 102 calculates the amount of temporal change of the spectrum, for example, if the frequency f of the formula (4) or (6) is the oscillation frequency of the vibrator or a harmonic of the oscillation frequency.

This makes it possible to calculate the amount of temporal change of the spectrum using the minimum frequencies required.

In this case, the spectrum-change calculating section 102 obtains the rotational frequency of a vibration motor of the vibrator 40 from the incoming-call control section 104.

The incoming-call control section 104 estimates a contacting state of the portable terminal device 1 from the amount of temporal change $\Delta$ of the spectrum obtained from the spectrum-change calculating section 102. Here, if the portable terminal device 1 touches a single surface on a desk or the like, the amount of temporal change is small. Also, if the portable terminal device 2 touches multiple surfaces in a bag, a pocket of clothes, or the like, the amount of temporal change is great.

Figure 5A:
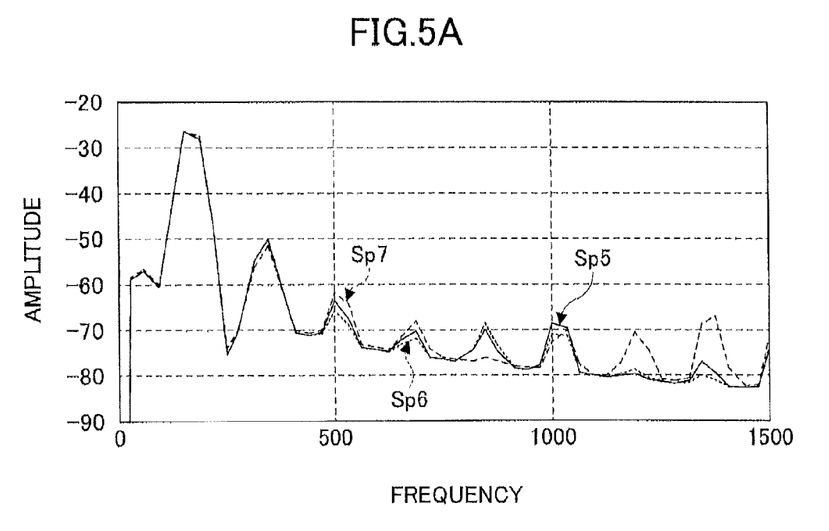
FIGS. 5A-5B are schematic views illustrating examples of temporal changes of spectrums.

FIGS. 5A-5B are schematic views illustrating examples of temporal changes of spectrums. FIG. 5A illustrates a temporal change of a spectrum for a case where the contacting state does not change. The case where the contacting state does not change is, for example, a case where the portable terminal device 1 is placed on a single surface of a desk or the like. FIG. 5A illustrates a spectrum of a vibrator sound when the portable terminal device 1 is placed on a desk.

Sp5 illustrated in FIG. 5A represents a power spectrum at a time s, Sp6 represents a power spectrum at the time s−1, and Sp7 represents a power spectrum at the time s−2. As illustrated in FIG. 5A, it can be understood that if the contacting state does not change, temporal change of the spectrum of the vibration sound is small. If the contacting state does not change, the vibration sound is likely to be noticed by a user.

Figure 5B:
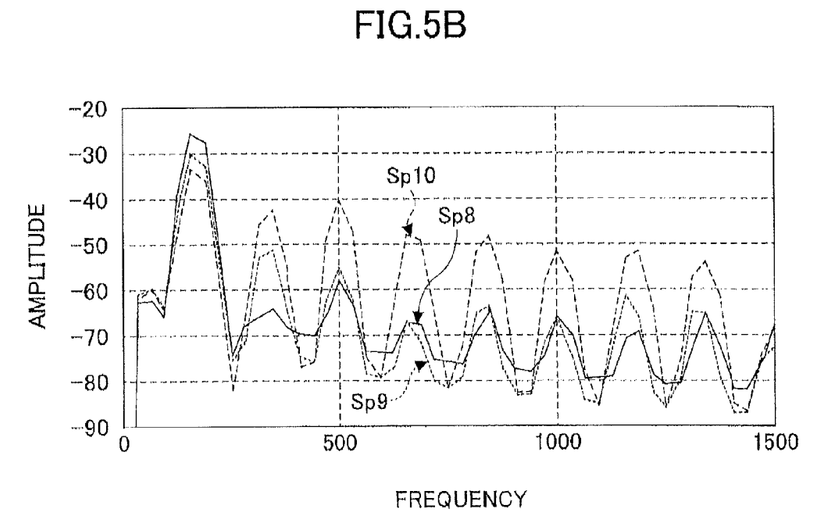

FIG. 5B illustrates a temporal change of a spectrum for a case where the contacting state changes. The case where the contacting state changes is, for example, a case where the portable terminal device 1 touches multiple surfaces in a bag, a pocket of clothes, or the like. FIG. 5B illustrates a spectrum of the vibration sound when the portable terminal device 1 is put in a bag.

Sp8 illustrated in FIG. 5B represents a power spectrum at a time s, Sp9 represents a power spectrum at the time s−1, and Sp10 represents a power spectrum at the time s−2. As illustrated in FIG. 5B, if the contacting state changes, the temporal change of the spectrum of the vibration sound becomes great. If the contacting state changes, the vibration sound is likely to be unnoticed by a user.

Thus, it is possible for the portable terminal device 1 to estimate the contacting state of the housing of the portable terminal device 1 based on the amount of temporal change of the spectrum of the vibration sound. By estimating the contacting state, proper control of an incoming call can be executed.

When receiving an incoming-call signal, the incoming-call control section 104 executes control of the vibrator 40 and/or a ringtone. The incoming-call control section 104 properly controls the vibrator 40 and/or the ringtone depending on a contacting state of the portable terminal device 1.

Figure 6:
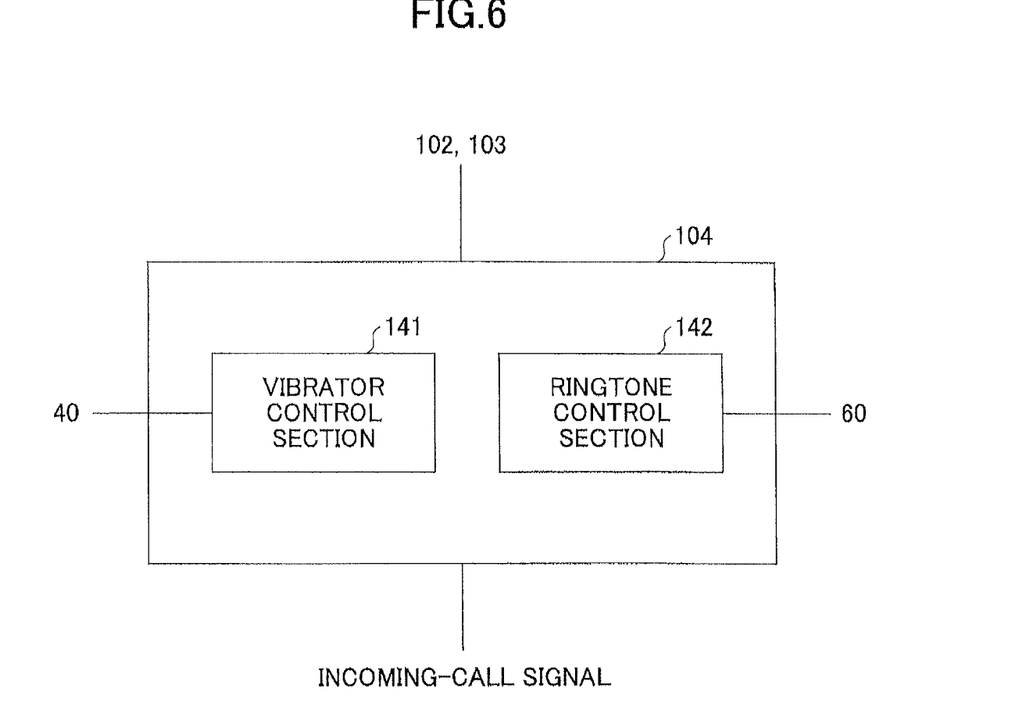
FIG. 6 is a block diagram illustrating an example of functions of incoming call control in an incoming-call control section.

FIG. 6 is a block diagram illustrating an example of functions of incoming call control in the incoming call control section 104. As illustrated in FIG. 6, the incoming-call control section 104 includes a vibrator control section 141 and a ringtone control section 142.

The vibrator control section 141 controls a motor (not illustrated) of the vibrator 40. The vibrator control section 141 controls the oscillation frequency of the vibrator 40 is set to a great value if it is estimated that the contacting state is to be changed. The vibrator control section 141 controls it to be set to a predetermined oscillation frequency if it is estimated that the contacting state is not to be changed. The predetermined oscillation frequency is a normal oscillation frequency or the like.

The vibrator control section 141 may adjust the vibration of the vibrator 40 to make an analysis of the vibration sound easier if there is noise in the input sound from the microphone 5. The vibrator control section 141, for example, makes the vibration of the vibrator 40 greater, or changes the frequency of the vibration sound. In the following, these methods will be described.

Control the Oscillation Frequency (Amplitude)

The vibrator control section 141 accumulates level differences (SNR) between the power spectrum of the input sound when vibrating obtained by the spectrum-change calculating section 102, and the power spectrum of the noise according to the following formula (7).

$$SNR = \sum_{f=f_{low}}^{f_{high}} S(f) - \text{noise}(f) \quad \text{FORMULA 7}$$

The vibrator control section 141 executes control of a vibration motor that has multiple weights with different radii R. For example, the vibrator control section 141 switches to a weight having a greater radius if SNR obtained by the formula (7) is smaller than the threshold value of SNR, $THR_{SNR2}$, to make the vibration or amplitude of the vibrator 40 greater.

Also, the vibrator control section 141 executes control so that a normal weight is used if SNR obtained by the formula (7) is greater than the threshold value of SNR, $THR_{SNR2}$. The threshold value $THR_{SNR2}$ is set to, for example, 3 dB, which is set to an appropriate value beforehand by an experiment or the like.

Thus, the vibration of the vibrator 40 is enlarged (amplitude is enlarged) if the influence of noise is great, which makes it possible to improve calculation precision of the temporal change of a spectrum of vibration sound.

Control Frequency

The vibrator control section 141 obtains level difference ($SNR_p$) between the power spectrum of the input sound under vibration that is obtained by the spectrum-change calculating section 102, and the power spectrum of the noise, which can be calculated with the formula (5).

The vibrator control section 141 counts cases where the obtained level difference $SNR_p$ is smaller than the threshold value $THR_{SNR3}$. This makes it possible to count the number of bands whose level difference is small. The vibrator control section 141 controls the rotational frequency of the vibration motor to increase or decrease if the counted value is greater than the threshold value $THR_{count}$. This makes it possible to shift a frequency at which the peak value of the spectrum of the vibration sound is obtained.

Figure 7A:
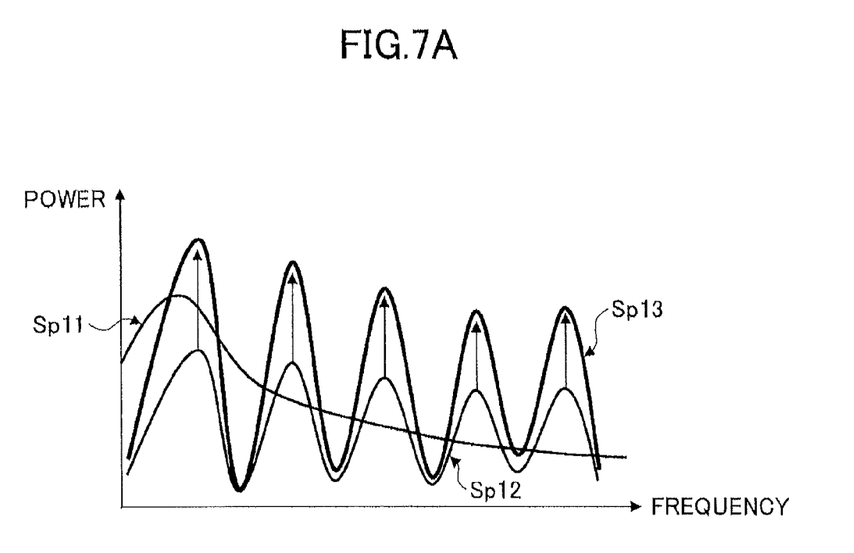
FIGS. 7A-7B are schematic views illustrating results of vibration adjustment of a vibrator.

FIGS. 7A-7B are schematic views illustrating results of vibration adjustment of the vibrator 40. FIG. 7A illustrates an example of a spectrum with an enlarged amplitude. Sp11 illustrated in FIG. 7A represents a noise spectrum, Sp12 represents a spectrum of the vibration sound before adjustment, and Sp13 represents a spectrum of the vibration sound after adjustment. As illustrated in FIG. 7A, the amplitude of the vibration sound becomes great if vibrating with a weight that has a great radius.

Figure 7B:
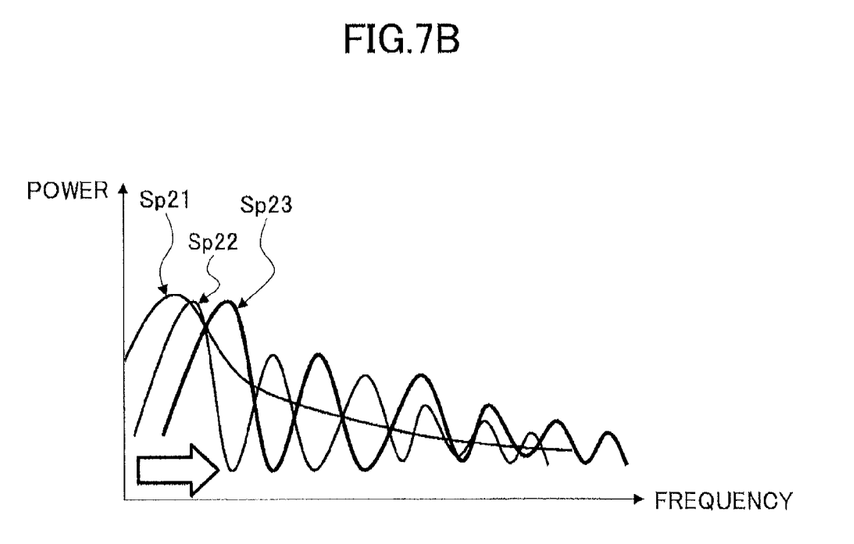

FIG. 7B illustrates an example of a spectrum with a shifted frequency. Sp21 illustrated in FIG. 7B represent a noise spectrum, Sp22 represents a spectrum of the vibration sound before adjustment, and Sp23 represents a spectrum of the vibration sound after adjustment. As illustrated in FIG. 7B, by increasing the rotational frequency of the vibration motor, the spectrum of the vibration sound is shifted to a higher frequency. Here, the spectrum of the vibration sound may be shifted to a lower frequency by decreasing the rotational frequency of the vibration motor.

By adjusting the vibration of the vibrator 40 as illustrated in FIGS. 7A-7B, it is possible to improve calculation precision of the temporal change of a spectrum for vibration sound.

Returning to FIG. 6, the ringtone control section 142 controls the ringtone (incoming-call sound) to be louder if the contacting state is estimated to be changed. The ringtone control section 142 controls the ringtone set beforehand to be output from the loudspeaker 60 if the contacting state is estimated to remain unchanged.

Thus, it is possible for the portable terminal device 1 to control the vibrator and the ring tone properly based on the estimated contacting state.

<Operation>

Figure 8:
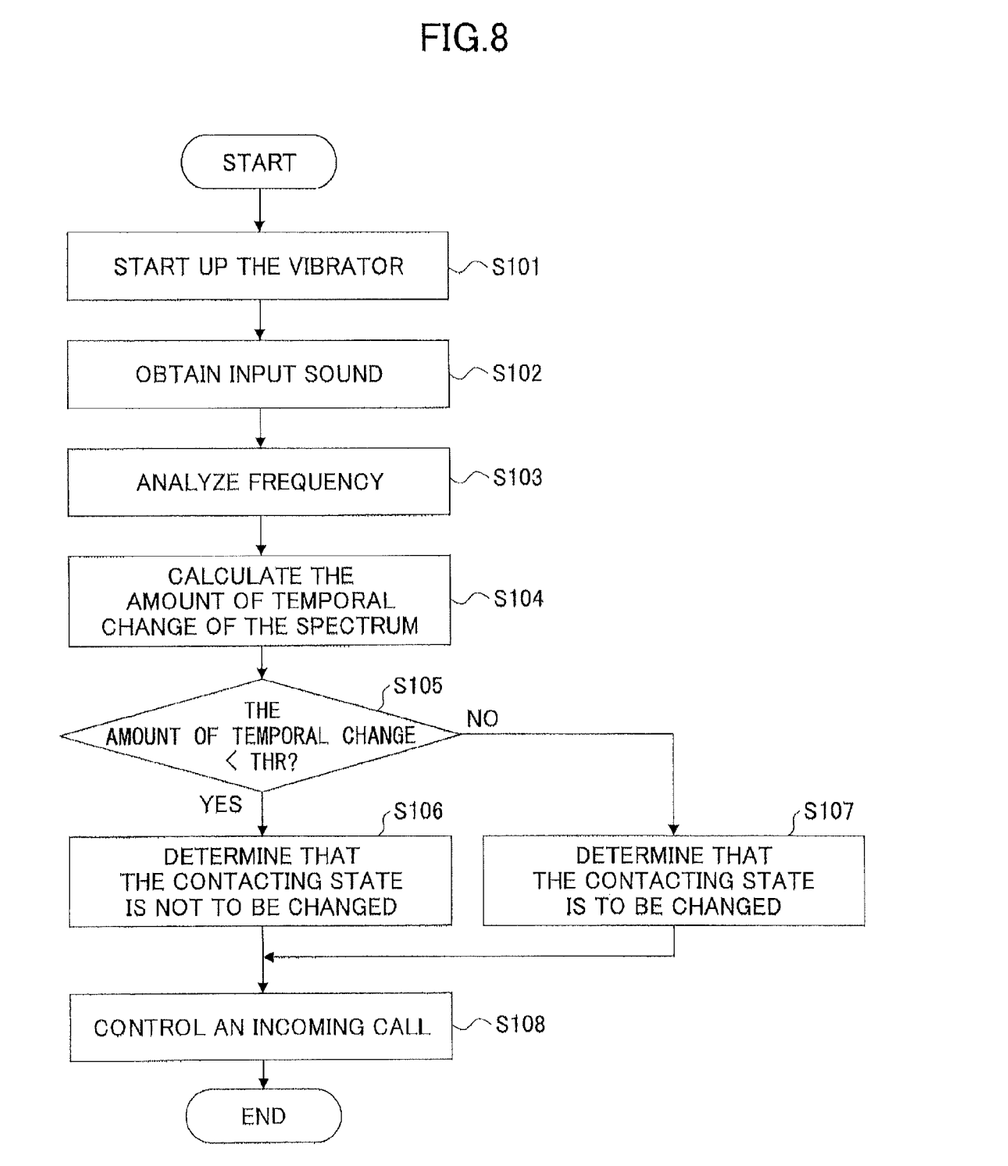
FIG. 8 is a flowchart illustrating an example of a control procedure of a portable terminal device according to the first embodiment.

Next, operations of the portable terminal device 1 will be described according to the first embodiment. FIG. 8 is a flowchart illustrating an example of a control procedure of the portable terminal device 1 according to the first embodiment.

At Step S101 illustrated in FIG. 8, the vibrator control section 141 starts up the vibrator 40 when receiving an incoming call, or at a regular interval by a timer.

At Step S102, the frequency analysis section 101 obtains input sound including vibration sound from the microphone 50.

At Step S103, the frequency analysis section 101 applies a frequency analysis, for example, FFT or the like, to the input sound.

At Step S104, the spectrum-change calculating section 102 calculates the amount of temporal change of the spectrum. At this moment, the spectrum-change calculating section 102 may calculate the amount of temporal change of the spectrum within the predetermined band where noise is removed.

At Step S105, the incoming-call control section 104 determines whether the amount of temporal change is below the threshold value. If it is below the threshold value (Step S105—YES), Step S106 is taken, if it is over the threshold value (Step S105—NO), Step S107 is taken.

At Step S106, the incoming-call control section 104 determines that the contacting state of the portable terminal device 1 is not to be changed.

At Step S107, the incoming-call control section 104 determines that the contacting state of the portable terminal device 1 is to be changed.

At Step S108, the incoming-call control section 104 properly controls the vibrator 40 and/or the ringtone when receiving an incoming call with the estimation result of the contacting state. For example, if the contacting state of the portable terminal device 1 is estimated to be changed, the incoming-call control section 104 increases the rotational frequency of the vibration motor, or increases the ringtone. If the contacting state of the portable terminal device 1 is determined not to be changed, the incoming-call control section 104 rotates the vibration motor at the rotational frequency set beforehand, or outputs the ringtone from the loudspeaker 60 with the volume set beforehand.

As above, according to the first embodiment, it is possible to control the vibrator 40 and the ringtone properly based on the estimated contacting state, which is obtained by calculating the amount of temporal change of the spectrum to estimate the contacting state. Also, according to the first embodiment, by calculating the amount of temporal change within the predetermined band where the influence of noise is removed, calculation precision can be improved. Also, according to the first embodiment, if it is determined that the influence of noise is great, the vibration sound can be made easily detectable by adjusting the vibration of the vibrator 40 to make the vibration sound loud or to shift the frequency of the vibration sound.

Second Embodiment

Next, a portable terminal device 1 will be described according to the second embodiment.

According to the second embodiment, determination of the contacting state is executed when a light receiving state of the housing of the portable terminal device 1 is changed. This is because there is a possibility of a change of the contacting state if the light receiving state changes. According to the second embodiment, the hardware of the portable terminal device 1 includes an optical sensor 201, which will be described later, a memory 202, and the other hardware which is the same as in the first embodiment.

<Function>

Figure 9:
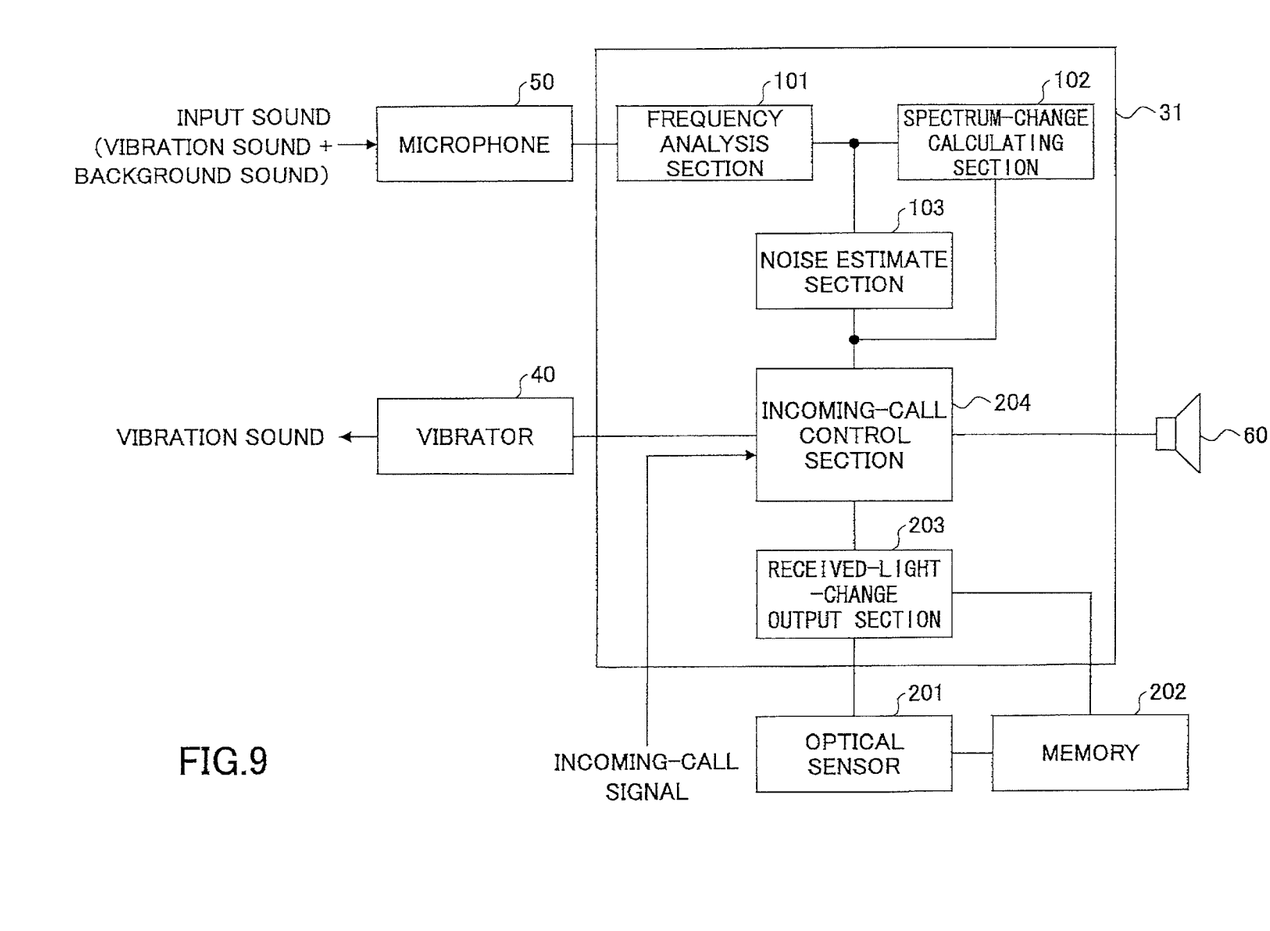
FIG. 9 is a block diagram illustrating an example of functions of a control section according to a second embodiment.

Next, functions of the control section 31 of the portable terminal device 1 will be described according to the second embodiment. FIG. 9 is a block diagram illustrating an example of functions of the control section 31 according to a second embodiment. As illustrated in FIG. 9, the control section 31 includes a frequency analysis section 101, a spectrum-change calculating section 102, a noise estimate section 103, an incoming-call control section 204, and a received-light-change output section 203. The functions illustrated in FIG. 9 are assigned the same numeral codes as the function illustrated in FIG. 2, whose description is omitted.

First, the optical sensor 201 receives light on the housing. The optical sensor 201 measures a light receiving time u of a received light signal that has a predetermined amount of light, to determine whether the light receiving time u is more than a threshold value $THR_{light}$. The threshold value $THR_{light}$ is set to, for example, 30 s, which is set to an appropriate value beforehand by an experiment or the like.

The optical sensor 201 sets a light receiving state of the housing based on the light receiving time u. A flag designating a "bright state" or designating a "dark state" is set in the memory 202 to designate the light receiving state. The memory 202 stores the flag representing the light receiving state.

When the Light Receiving State is "Bright State"

The optical sensor 201 keeps the flag in the memory 202 unchanged if the light receiving time u is greater than the threshold value $THR_{light}$, or sets the flag designating "dark state" in the memory 202 if below the threshold value $THR_{light}$.

When the Light Receiving State is "Dark State"

The optical sensor 201 keeps the flag in the memory 202 unchanged if the light receiving time u is below the threshold value $THR_{light}$, or sets the flag designating "bright state" in the memory 202 if over the threshold value $THR_{light}$.

If detecting a change of the light receiving state, the received-light-change output section 203 of the control section 31 outputs a command for vibrating the vibrator 40 to the incoming-call control section 204. The received-light-change output section 203 can detect a change of the light receiving state, for example, by a change of the flag in the memory 202.

Here, the received-light-change output section 203 may hold the flag of the light receiving state by itself, and may obtain a light receiving time u directly from the optical sensor 201, to detect a change in the light receiving environment.

If receiving the command for vibrating the vibrator 40 from the received-light-change output section 203, the incoming-call control section 204 vibrates the vibrator 40, with which the control section 31 starts an estimation of the contacting state. The estimation of the contacting state is the same as in the first embodiment.

Thus, it is possible to reduce ineffective estimation of the contacting state by starting the estimation triggered by a change of the light receiving state.

<Operation>

Figure 10:
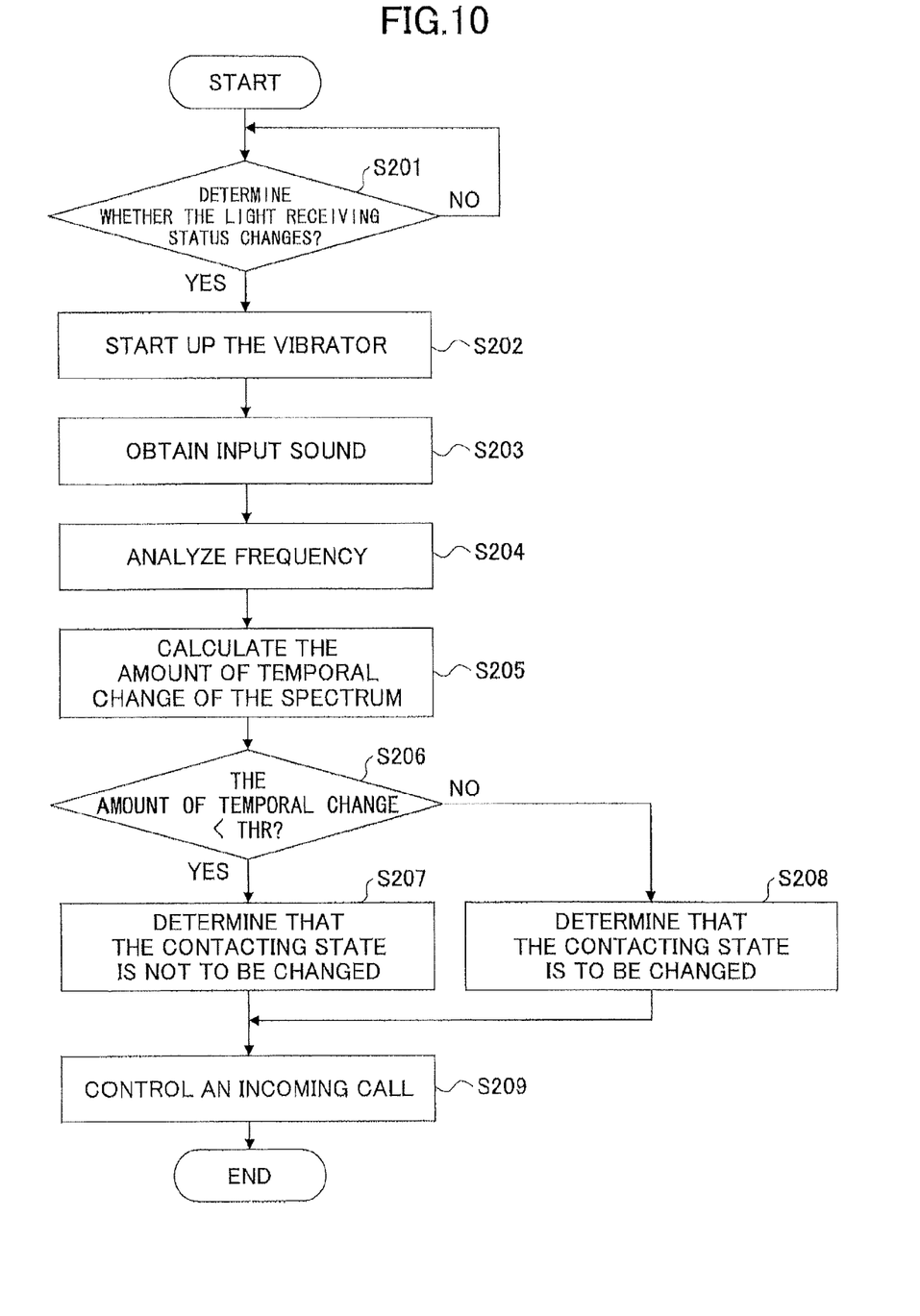
FIG. 10 is a flowchart illustrating an example of a control procedure of a portable terminal device according to the second embodiment.

Next, operations of the portable terminal device 1 will be described according to the second embodiment. FIG. 10 is a flowchart illustrating an example of a control procedure of the portable terminal device 1 according to the second embodiment.

At Step S201 illustrated in FIG. 10, the received-light-change output section 203 determines whether the light receiving state changes. For example, the received-light-change output section 203 determines that the light receiving state changes if the flag in the memory 202 is changed.

The following Steps S202 to S209 are the same as Steps S101 to S108 illustrated in FIG. 8, whose description is omitted.

As above, according to the second embodiment, the estimate of the contacting state can be started with a trigger of a change of the light receiving state, to reduce ineffective estimation of the contacting state.

Third Embodiment

Next, a portable terminal device 1 will be described according to the third embodiment. According to the third embodiment, incoming-call control is executed in stages depending on the amount of temporal change of the spectrum. This makes it possible to execute proper incoming-call control depending on a degree of the contacting state. The hardware of the portable terminal device 1 in the third embodiment is the same as in the first embodiment.

<Function>

Figure 11:
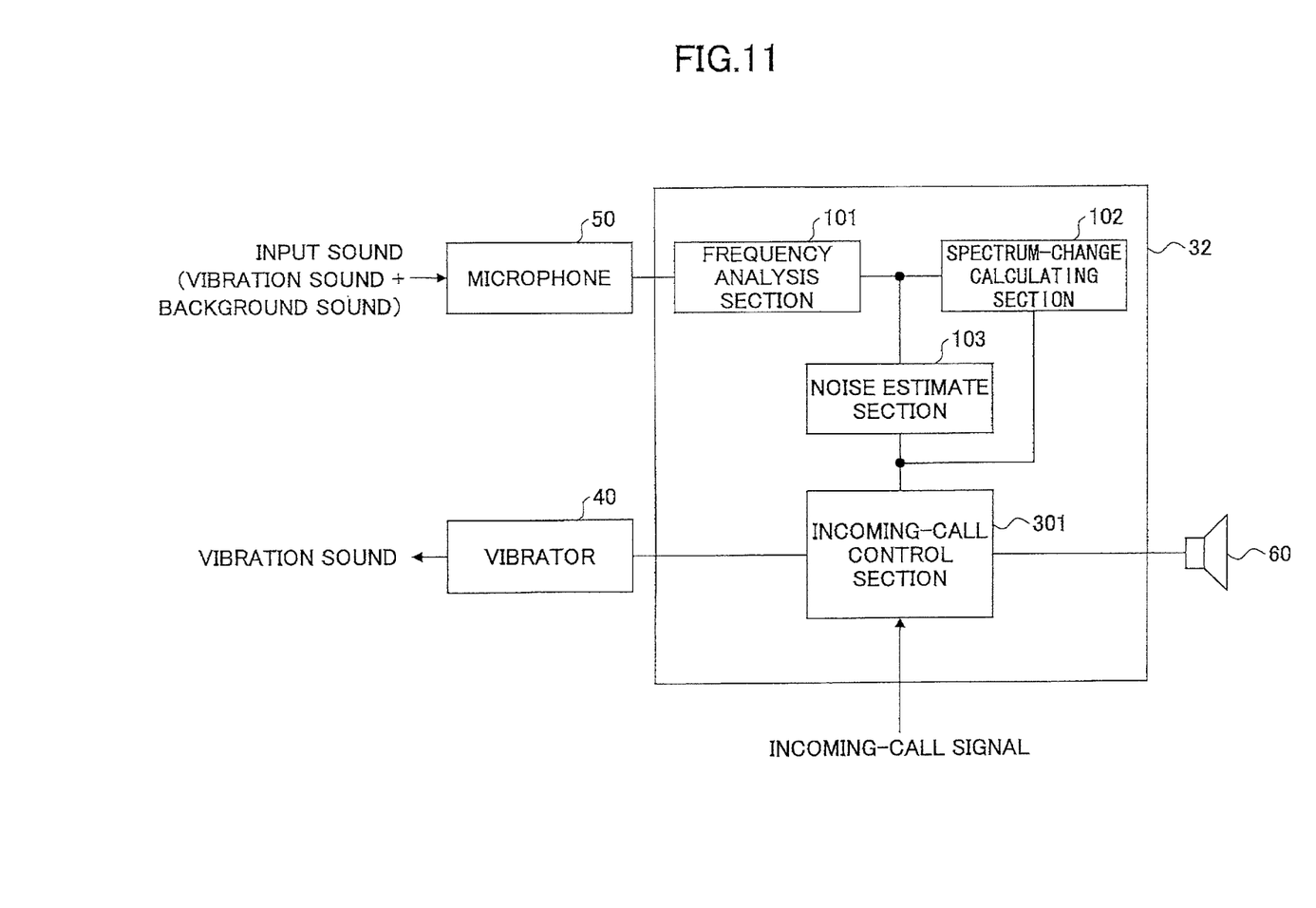
FIG. 11 is a block diagram illustrating an example of functions of a control section according to a third embodiment.

Next, functions of the control section 32 of the portable terminal device 1 will be described according to the third embodiment. FIG. 11 is a block diagram illustrating an example of functions of a control section according to the third embodiment. As illustrated in FIG. 11, the control section 32 includes a frequency analysis section 101, a spectrum-change calculating section 102, a noise estimate section 103, and an incoming-call control section 301. The functions illustrated in FIG. 11 are assigned the same numeral codes as the functions illustrated in FIG. 2, and their description is omitted.

The incoming-call control section 301 illustrated in FIG. 11 obtains the amount of temporal change of a spectrum from the spectrum-change calculating section 102. The incoming-call control section 301 controls the oscillation frequency of the vibrator 40 and the amount of amplification of the ringtone depending on the obtained amount of temporal change.

Figure 12:
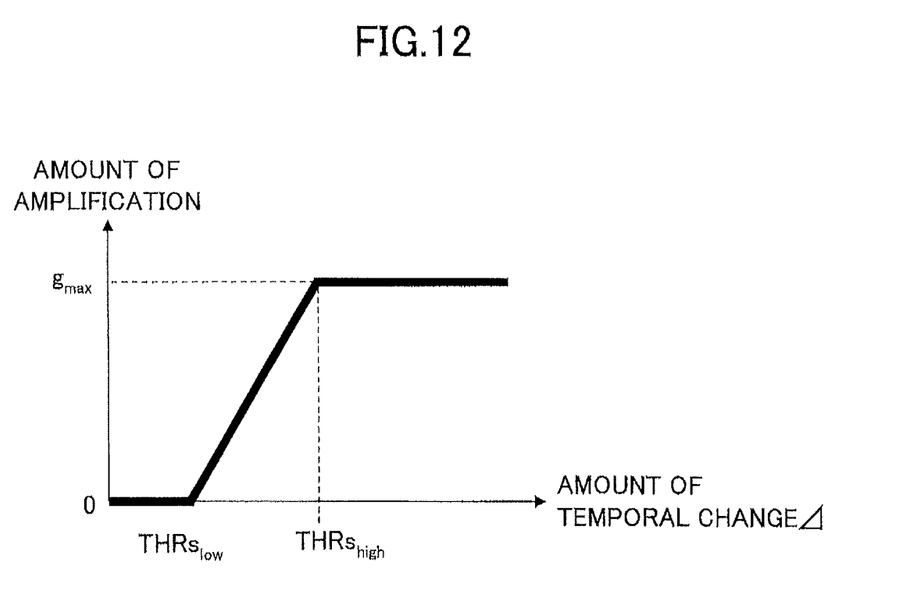
FIG. 12 is a schematic view illustrating an example of a relationship between amount of amplification of a ringtone and amount of temporal change.

FIG. 12 is a schematic view illustrating an example of a relationship between amount of amplification of a ringtone and amount of temporal change. As illustrated in FIG. 12, the greater the amount of temporal change of the spectrum is, the greater gain the ringtone is controlled to have. The incoming-call control section 301 may determine gain depending on the amount of temporal change $\Delta$ by defining a function $g=G(\Delta)$ illustrated in FIG. 12.

Here, $g_{max}$ illustrated in FIG. 12 represents a maximum amount of amplification, a threshold value $THRs_{low}$ represents a lower-limit threshold value of the amount of temporal change, and a threshold value $THRs_{high}$ represents an upper-limit threshold value of the amount of temporal change.

Also for the oscillation frequency of the vibrator 40, the incoming-call control section 301 controls the oscillation frequency of the vibrator 40, as illustrated in FIG. 12, to be increased as the amount of temporal change becomes great. This makes it possible to execute proper incoming-call control depending on a degree of the contacting state.

<Operation>

Figure 13:
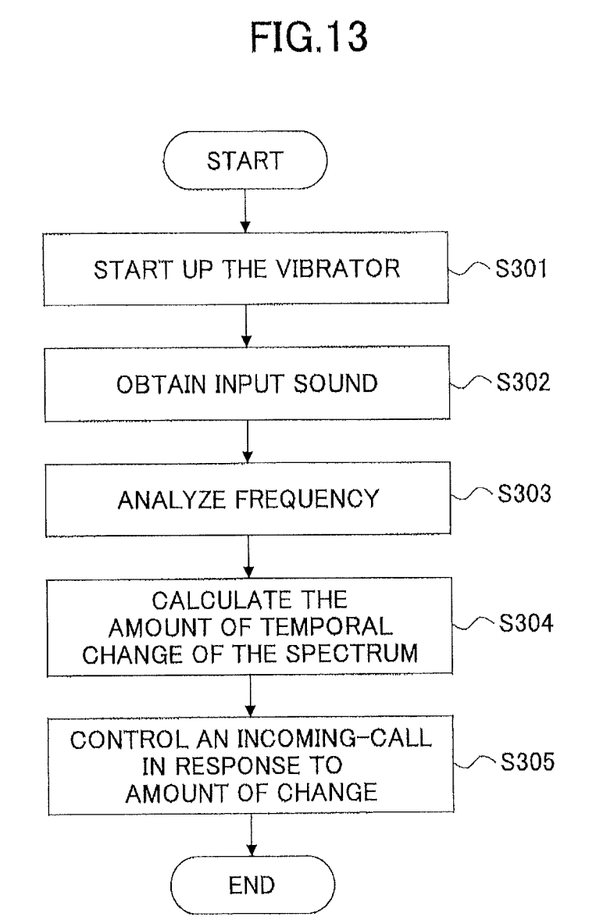
FIG. 13 is a flowchart illustrating an example of a control procedure of a portable terminal device according to the third embodiment.

Next, operations of the portable terminal device 1 will be described according to the third embodiment. FIG. 13 is a flowchart illustrating an example of a control procedure of the portable terminal device 1 according to the third embodiment.

Steps S301 to S304 illustrated in FIG. 13 are the same as S101 to S104 illustrated in FIG. 8, whose description is omitted.

At Step S305, the incoming-call control section 301 executes incoming-call control depending on the amount of temporal change of the spectrum obtained from the spectrum-change calculating section 102. For example, the incoming-call control section 301 increases the oscillation frequency of the vibrator 40 and/or the amount of amplification of the ringtone greater as the amount of temporal change becomes greater (see FIG. 12).

Thus, it is possible to execute proper incoming-call control depending on a degree of the contacting state.

Modified Example

Also, it is possible to have a computer execute the control processing described in the first to third embodiments above by recording a program implementing the control processing according to the embodiments above in a recording medium.

Also, it is possible to implement the above control processing by recording the program on a recording medium and having a computer or a portable terminal device read the recording medium on which the program is recorded. Here, various types of recording media can be used including a recording medium that records information optically, electrically, or magnetically such as a CD-ROM, a flexible disk, an optical magnetic disk and the like, and a semi-conductor memory and the like that records information electrically such as a ROM, a flash memory, and the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A portable terminal device comprising:
   a vibrator configured to vibrate a housing;
   an analysis section configured to execute frequency analysis on an input sound from a microphone;
   a calculating section configured to calculate an amount of temporal change of a spectrum obtained by the analysis section for the input sound when the housing vibrates; and
   a control section configured to execute incoming-call control depending on the calculated amount of the temporal change.

2. The portable terminal device as claimed in claim 1, wherein the calculating section calculates the amount of temporal change of the spectrum within a predetermined band.

3. The portable terminal device as claimed in claim 2, further comprising:
   an estimate section configured to estimate a noise spectrum from a spectrum of the input sound when vibration stops;
   wherein the calculating section sets the predetermined band to a band where the noise spectrum estimated by the estimate section is smaller than a first threshold value.

4. The portable terminal device as claimed in claim 2, further comprising:
   an estimate section configured to estimate a noise spectrum from a spectrum of the input sound when vibration stops;
   wherein the calculating section calculates the amount of change within a band set by comparing the noise spectrum estimated by the estimate section and a spectrum when vibration takes place.

5. The portable terminal device as claimed in claim 1, wherein the calculating section calculates an amount of change by accumulating the amount of change at a plurality of times.

6. The portable terminal device as claimed in claim 1, wherein the control section calculates the amount of change within a band corresponding to an oscillation frequency of the vibrator.

7. The portable terminal device as claimed in claim 1, wherein the control section increases volume of a ringtone or an oscillation frequency of the vibrator based on the amount of temporal change calculated by the calculating section.

8. The portable terminal device as claimed in claim 1, further comprising:
   an output section configured to output a command for vibrating the vibrator to the control section based on a received light signal from an optical sensor.

9. The portable terminal device as claimed in claim 1, wherein the control section calculates the amount of change within a band corresponding to a harmonic of the oscillation frequency.

10. The portable terminal device as claimed in claim 1, wherein the control section calculates the amount of change within a band corresponding to an oscillation frequency of the vibrator and within a band corresponding to a harmonic of the oscillation frequency.

11. A method of controlling a portable terminal device, comprising:
    executing frequency analysis on an input sound from a microphone when a housing is vibrated by a vibrator;
    calculating an amount of temporal change of a spectrum obtained as a result of the executing frequency analysis; and
    executing incoming-call control depending on the calculated amount of the temporal change.

* * * * *